US008918230B2

(12) United States Patent
Chen et al.

(10) Patent No.: US 8,918,230 B2
(45) Date of Patent: Dec. 23, 2014

(54) TELEOPERATION OF UNMANNED GROUND VEHICLE

(75) Inventors: Peter David Chen, Somerville, MA (US); Dennis Bushmitch, Somerset, NJ (US)

(73) Assignee: Mitre Corporation, McLean, VA (US)

( * ) Notice: Subject to any disclaimer, the term of this patent is extended or adjusted under 35 U.S.C. 154(b) by 611 days.

(21) Appl. No.: 13/011,178

(22) Filed: Jan. 21, 2011

(65) Prior Publication Data

US 2012/0191269 A1 Jul. 26, 2012

(51) Int. Cl.
*G05D 1/00* (2006.01)

(52) U.S. Cl.
CPC ............ *G05D 1/0016* (2013.01); *G05D 1/0038* (2013.01); *G05D 2201/0209* (2013.01); *Y10S 901/01* (2013.01); *Y10S 901/47* (2013.01)
USPC ................... 701/2; 701/50; 37/414; 700/259; 901/1; 901/47

(58) Field of Classification Search
USPC ......................... 701/2, 23; 700/259; 901/1, 47
See application file for complete search history.

(56) References Cited

U.S. PATENT DOCUMENTS

| 5,200,987 | A | * | 4/1993 | Gray | 379/40 |
|---|---|---|---|---|---|
| 7,873,444 | B1 | * | 1/2011 | Ehrmantraut et al. | 701/2 |
| 8,052,096 | B2 | * | 11/2011 | Cerchie et al. | 244/197 |
| 8,199,109 | B2 | * | 6/2012 | Robbins et al. | 345/161 |
| 8,244,469 | B2 | * | 8/2012 | Cheung et al. | 701/519 |
| 8,392,036 | B2 | * | 3/2013 | Jacobsen et al. | 701/2 |
| 8,718,838 | B2 | * | 5/2014 | Kokkeby et al. | 701/3 |
| 2006/0271251 | A1 | * | 11/2006 | Hopkins | 701/23 |
| 2007/0073436 | A1 | * | 3/2007 | Sham | 700/164 |
| 2010/0017046 | A1 | * | 1/2010 | Cheung et al. | 701/2 |
| 2010/0118147 | A1 | * | 5/2010 | Dorneich et al. | 348/155 |
| 2011/0046781 | A1 | * | 2/2011 | Summer | 700/248 |
| 2011/0102459 | A1 | * | 5/2011 | Hall | 345/633 |
| 2011/0103293 | A1 | * | 5/2011 | Gale et al. | 370/315 |
| 2011/0106339 | A1 | * | 5/2011 | Phillips et al. | 701/2 |
| 2012/0072023 | A1 | * | 3/2012 | Ota | 700/259 |
| 2012/0262708 | A1 | * | 10/2012 | Connolly | 356/237.2 |

FOREIGN PATENT DOCUMENTS

JP 10285099 A * 10/1998
JP 3959778 B2 * 8/2007

* cited by examiner

*Primary Examiner* — Tuan C. To
(74) *Attorney, Agent, or Firm* — Poskauer Rose LLP (57) ABSTRACT

Described are systems and methods, including computer program products for controlling an unmanned vehicle. A user controls one or more unmanned vehicles with a smart phone. The smart phone receives video stream from the unmanned vehicles, and the smart phone displays the controls from the unmanned vehicle over the video. The smart phone and the unmanned vehicle communicate wirelessly.

18 Claims, 11 Drawing Sheets

TELEOPERATION OF UNMANNED GROUND VEHICLE

GOVERNMENT RIGHTS

The technology described herein was developed with funding provided by the PM NSI Network Analysis Integration Lab, contract number: W15P7T-10-C-F600. The government may have rights in the technology.

FIELD OF THE INVENTION

The invention relates generally to controlling an unmanned vehicle with a smart phone, including converting input received by the smart phone into a format that is recognizable by the unmanned vehicle.

BACKGROUND

Unmanned vehicles generally refer to any type of vehicle that can be driven without a pilot in the vehicle. For example, PackBot® and Small Unmanned Ground Vehicle (SUGV)® are unmanned ground vehicles manufactured by IRobot®. Typically, unmanned vehicles are driven by an operator using a controller that is remote relative to the unmanned vehicle. Unmanned vehicles can be automatically driven along a predetermined path. The predetermined path can be stored in a computer of the unmanned vehicle or communicated to the unmanned vehicle.

Unmanned vehicles are used by the military in air, on ground, and in water. For example, the military uses unmanned vehicles for reconnaissance, attack missions, and as decoys. Unmanned vehicles are used in civilian applications as well. For example, fire-fighting and non-military surveillance activities are considered civilian applications.

Unmanned vehicles can be driven using controllers that are specific to the unmanned vehicle or universal controllers. For example, an SUGV® can be controlled by an SUGV® controller or by an Xbox® controller. A controller that is specific to the unmanned vehicle requires training for a user to learn how to operate the controller. For users who operate multiple types of unmanned vehicles (e.g., military personnel), learning a new controller for each unmanned vehicle can become time consuming and costly. Users who operate multiple unmanned vehicles are prone to make controlling errors because they are likely to confuse the various controllers in a high pressure situation.

Unmanned vehicle controllers can be large, bulky, and heavy, making it difficult to carry the controllers from place to place. A large controller typically requires a large amount of power, making battery life short. In addition, unmanned vehicle controllers are often expensive. Therefore, a universal unmanned vehicle controller that is light weight and inexpensive is desirable

SUMMARY OF THE INVENTION

In one aspect, the invention features a computerized method for controlling an unmanned vehicle. The computerized method involves, receiving, by a smart phone, a request to control the unmanned vehicle and establishing, by the smart phone, wireless communication between the smart phone and the unmanned vehicle. The method also involves, receiving, by the smart phone, a video stream generated by the unmanned vehicle, displaying the video stream and vehicle controls on a touch-sensitive display screen within the smart phone, and manipulating the vehicle controls to direct the unmanned vehicle.

In some embodiments, the computerized method involves receiving, by the smart phone, information to direct the unmanned vehicle, converting, by the smart phone, the information into a protocol recognizable by the unmanned vehicle and transmitting, by the smart phone, the converted information to the unmanned vehicle.

In some embodiments, the computerized method involves establishing communication with the unmanned vehicle via a wireless local area network. In some embodiments, establishing communication involves transmitting, by the smart phone, an initiation request via a cable to a rf transmitter, transmitting, by the rf transmitter, the initiation request to the unmanned vehicle, receiving, by the rf transmitter, a message from the unmanned vehicle; and transmitting, by the rf transmitter, the message from the unmanned vehicle to the smart phone via the cable to the smart phone.

In some embodiments, the computerized method involves providing a joystick for governing the acceleration, deceleration, and direction of travel of the unmanned vehicle. In some embodiments, the computerized method involves providing a controller to govern movement of one or more robot arms of the unmanned ground vehicle. In some embodiments, the computerized method involves providing a control to set a maximum speed of the unmanned vehicle.

In some embodiments, the computerized method involves comprising providing a control to store a frame of the video stream as a picture on the smart phone. In some embodiments, the computerized method involves providing a control to command one or more cameras on the unmanned vehicle to zoom in or out. In some embodiments, the computerized method involves providing one or more controls to command the unmanned vehicle to one or more predetermined poses.

In some embodiments, the computerized method involves receiving, by the smart phone, information of objects within a distance of the unmanned vehicle and displaying, on the smart phone, the unmanned vehicle with the objects positioned relative to the unmanned vehicle based the information.

In some embodiments, the computerized method involves displaying the controls and a geographic map on the display screen within the smart phone. In some embodiments, the computerized method involves displaying one or more arrows, the video stream, and the controls on the display within the smart phone, wherein the one or more arrows indicate a heading for the unmanned vehicle such that the unmanned vehicle can reach a specified location.

In another aspect, the invention features a computerized method for controlling an unmanned vehicle. The computerized method also involves receiving, by a smart phone, a request to control the unmanned vehicle and establishing, by the smart phone, wireless communication between the smart phone and the unmanned vehicle. The computerized method also involves receiving, by operator manipulation of vehicle controls disposed on a touch-sensitive display screen within the smart phone, information to direct the unmanned vehicle in a direction, processing, by the smart phone, the information to reduce operator error, if any, within the information, and transmitting, by the smart phone, the processed information to the unmanned vehicle.

In some embodiments, the method involves receiving information to rotate the unmanned vehicle. In some embodiments, the method involves receiving information to move a robotic arm on the vehicle.

In another aspect, the invention features a computerized method for controlling an unmanned vehicle. The computerized method involves receiving, by a smart phone, a request to control the unmanned vehicle and establishing, by the smart phone, wireless communication between the smart phone and the unmanned vehicle. The computerized method also involves receiving, by the smart phone, a video stream generated by the unmanned vehicle, displaying the video stream and vehicle controls on a touch-sensitive display screen within the smart phone, and receiving, by operator manipulation of the vehicle controls, information to direct the unmanned vehicle in a direction. The computerized method also involves processing, by the smart phone, the information to reduce operator error, if any, within the information and transmitting, by the smart phone, the processed information to the unmanned vehicle.

In yet another aspect, the invention features a computerized method for controlling a plurality of unmanned vehicles. The computerized method involves receiving, by a smart phone, a request to control the unmanned vehicles and establishing, by the smart phone, wireless communication between the smart phone and each of the unmanned vehicles. The computerized method also involves receiving, by the smart phone, a video stream from each of the unmanned vehicles, selecting, by the smart phone, one of the plurality of unmanned vehicles and displaying the video stream and vehicle controls of the selected vehicle on a display screen within the smart phone. The computerized method also involves manipulating the displayed vehicle controls to direct the selected unmanned vehicle.

In some embodiments, the computerized method involves establishing a wireless communication further comprises transmitting, by the smart phone, a signal to each of the plurality of unmanned vehicles, such that the signal changes to a protocol of the particular unmanned vehicle the signal is transmitting to.

In some embodiments, the computerized method involves displaying controls that correspond to the particular unmanned vehicle from which the video stream is received. In some embodiments, the computerized method involves toggling between displaying the video stream and controls of each of the plurality of unmanned vehicles based on operator input.

In some embodiments, the computerized method involves selecting, by the smart phone, two of the plurality of the unmanned vehicles and displaying the video stream and controls of the two selected vehicles on a display screen within the smart phone and manipulating the displayed controls to direct the two selected unmanned vehicles.

Other aspects and advantages of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the invention, as well as the invention itself, will be more fully understood from the following description of various embodiments, when read together with the accompanying drawings.

DETAILED DESCRIPTION

In general overview, a smart phone receives a request from a user to control an unmanned vehicle. The smart phone establishes wireless communication with the unmanned vehicle and receives a video stream generated by the unmanned vehicle. The video stream is displayed on a touch-sensitive display screen within the smart phone. Vehicle controls that are capable of directing the unmanned vehicle when manipulated are displayed on the smart phone.

Figure 1:
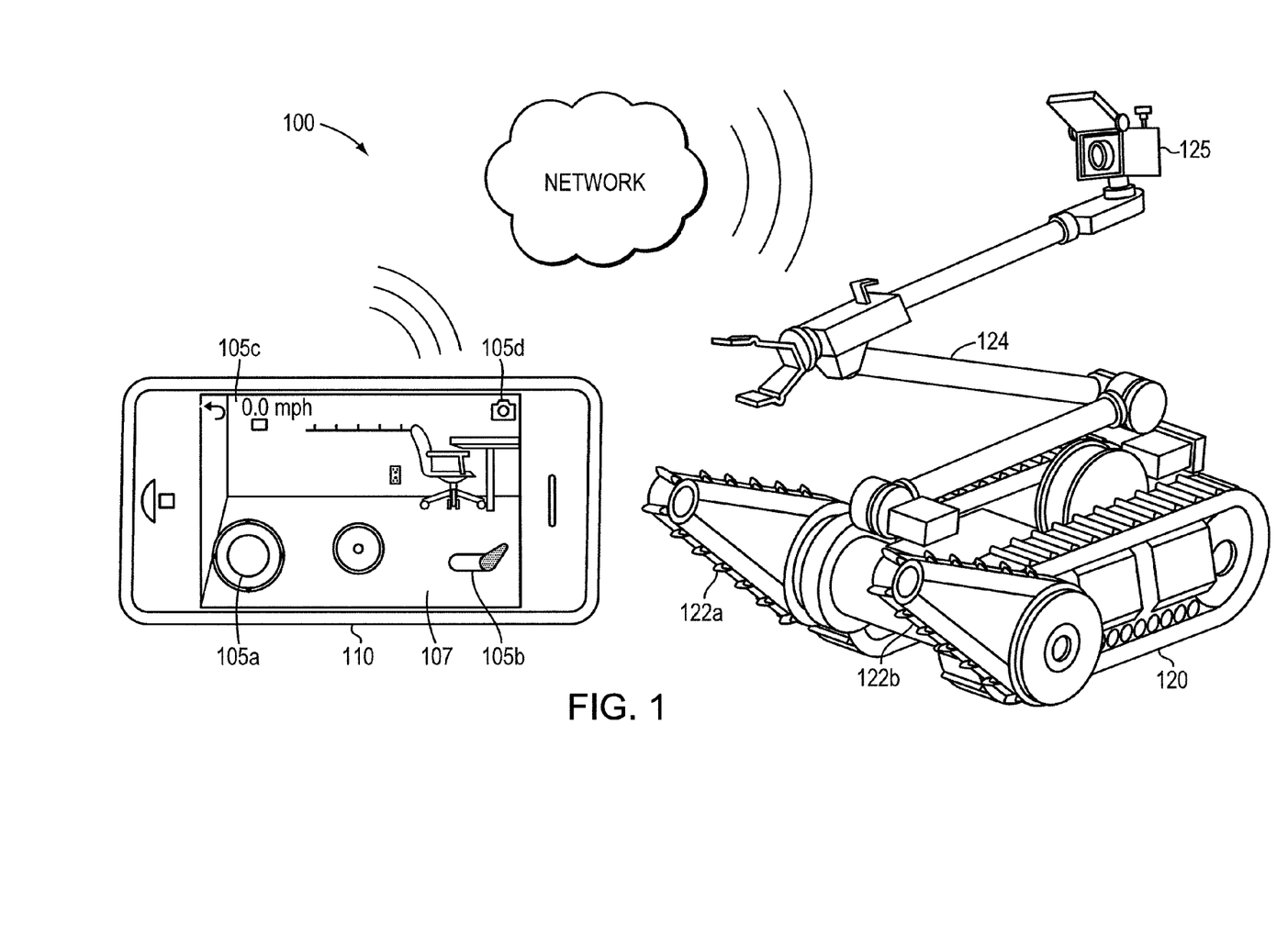
FIG. 1 is diagram showing an exemplary unmanned vehicle controller in communication with an unmanned vehicle, in accordance with an embodiment of the present invention.

FIG. 1 is diagram 100 showing an exemplary unmanned vehicle controller (e.g., smart phone 110) in communication with an unmanned vehicle 120 (e.g., PackBot®), according to an embodiment of the present invention.

The unmanned vehicle 120 can include a camera 125, a robotic arm 124 and flippers 122a and 122b. An operator (not shown) manipulates vehicle controls (e.g., drive control 105a, flipper control 105b, gear control 105c and camera control 105d, generally vehicle controls 105) that are displayed on a touch-screen video display 107 of smart phone 110. The operators' manipulation of the controls directs the unmanned vehicle 120. The smart phone 110 wirelessly transmits the operators' directions over network 130. Upon receipt of the operators' direction, the unmanned vehicle 120 executes the operators' directions.

The drive control 105a enables the operator to direct the unmanned vehicle to move in any direction. The flipper control 105b enables the operator to direct the unmanned vehicle flippers 122a, and 122b. The gear control 105c enables the operator to control the maximum speed the unmanned vehicle can travel. The camera control 105d enables the operator to control the unmanned vehicle camera 125 to take snapshots and video.

In some embodiments, the smart phone 100 transmits the operators' directions to the unmanned vehicle via WiFi.

In some embodiments, the smart phone 110 is any computing device that includes a touch-sensitive display. In some embodiments, the smart phone 110 is an iPhone®. In some embodiments, the user manipulates keys on the smart phone 110 to direct the unmanned vehicle. In some embodiments, the user speaks into the smart phone 110 to direct the unmanned vehicle 120.

Figure 2:
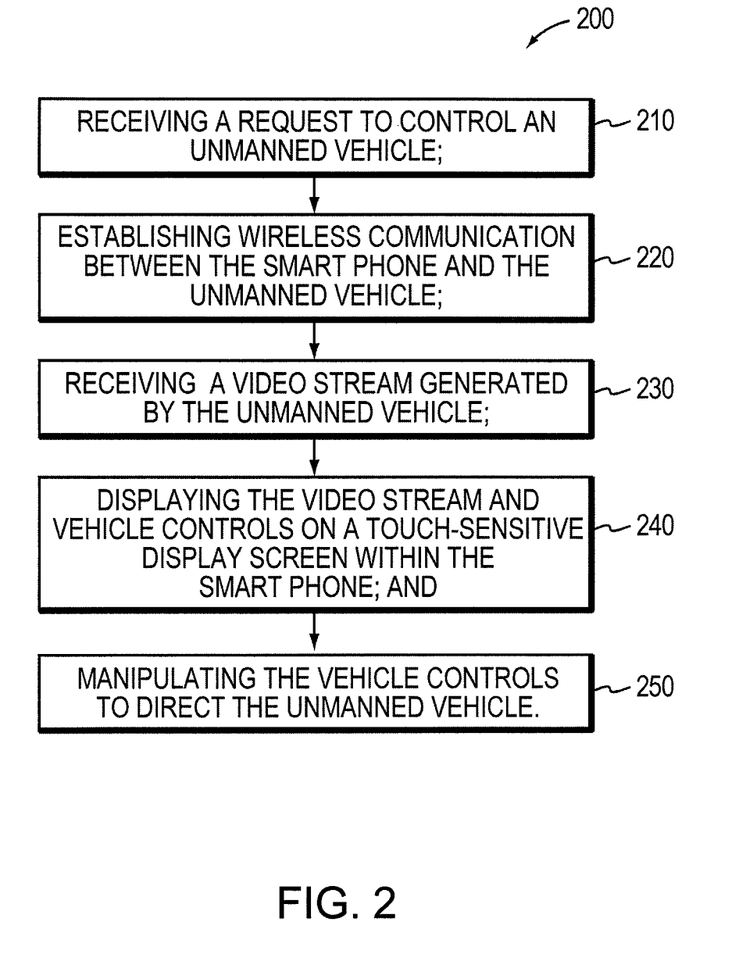
FIG. 2 is a flow chart of a method for controlling an unmanned vehicle, according to an embodiment of the present invention.

FIG. 2 is a flow chart 200 of a method for controlling an unmanned vehicle (e.g., unmanned vehicle 120 as described above in FIG. 1), according to an embodiment of the present invention. The method includes receiving, by a smart phone (e.g., smart phone 110 as described above in FIG. 1), a request to control an unmanned vehicle (Step 210).

Upon receiving the request, the smart phone establishes wireless communication between the smart phone and the unmanned vehicle (Step 220). In some embodiments, the smart phone transmits an initiation request via a transmitter that resides in the smart phone. The initiation request is transmitted in a protocol of the unmanned vehicle. For example, a PackBot® communicates via an iRobot proprietary messaging protocol while a SUGV® communicates via a Joint Architecture for Unmanned Systems (JAUS) messaging protocol. In some embodiments, the smart phone is connected to a radio frequency (RF) transmitter via a wire cable. In these embodiments, the wire cable can be Ethernet. In these embodiments, the smart phone establishes wireless communication by transmitting an initiation request via the wire cable to the RF transmitter. The RF transmitter transmits the initiation request to the unmanned vehicle.

The method also includes receiving a video stream generated by the unmanned vehicle by the smart phone (Step 230). The video stream and vehicle controls (e.g., vehicle controls 105 as described above in FIG. 1) are displayed on a touch-sensitive display within the smart phone (Step 240).

The video stream can be converted by the smart phone to a format that the smart phone can display. For example, a Pack-Bot® transmits video stream according to the iRobot proprietary messaging protocol, and an iPhone® typically displays video in one of several formats (e.g., Motion JPEG or H.264).

The vehicle controls can be controls that correspond to various types of unmanned vehicles. For example, a Pack-Bot® includes a controllable robot arm. Therefore, in Pack-Bot® embodiments, the controls that are displayed on the smart phone can include a control to direct the robot arm. In another example, an unmanned air vehicle includes an altitude control. Therefore, in unmanned air vehicle embodiments, the controls that are displayed on the smart phone can include a control to direct the altitude of the unmanned air vehicle.

The method also includes manipulating the vehicle controls to direct the unmanned vehicle (Step 250).

Figure 3:
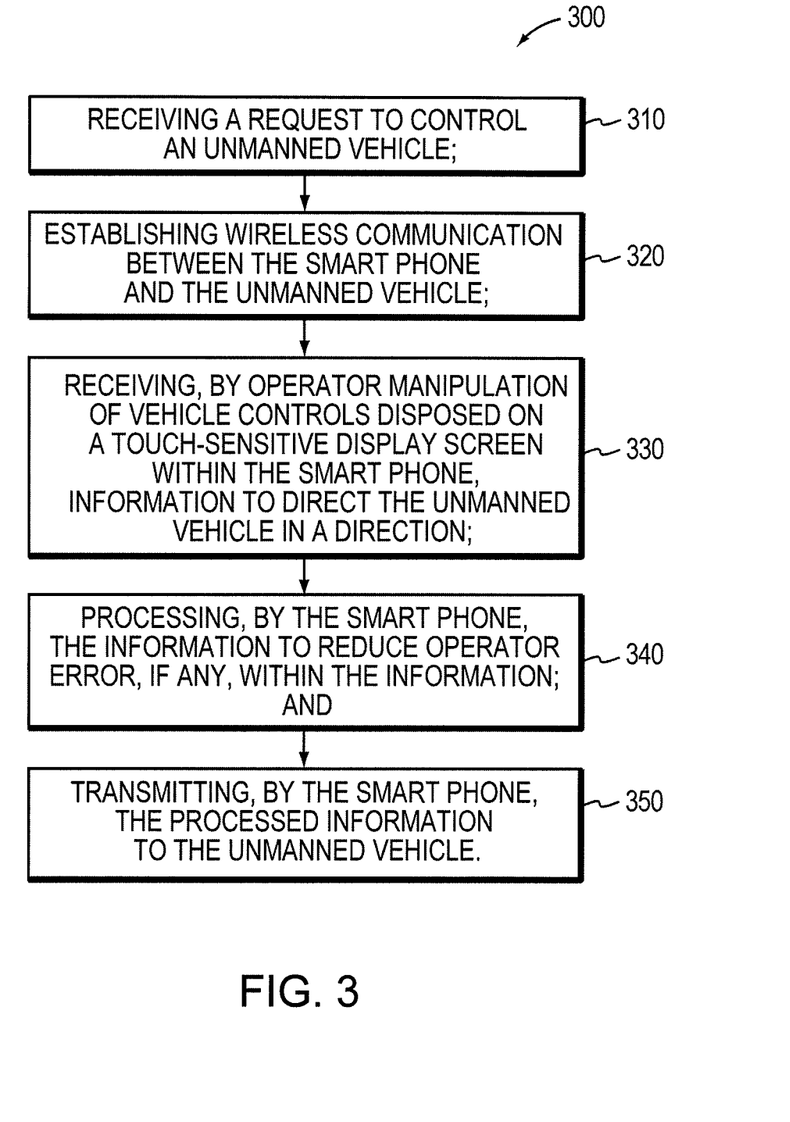
FIG. 3 is a flow chart of a method for controlling an unmanned vehicle, according to an embodiment of the present invention.

FIG. 3 is a flow chart 300 of a method for controlling an unmanned vehicle (e.g., unmanned vehicle 120 as described above in FIG. 1), according to an embodiment of the present invention. The method includes receiving, by a smart phone (e.g., smart phone 110 as described above in FIG. 1), a request to control an unmanned vehicle (Step 310).

Upon receiving the request, the smart phone establishes wireless communication between the smart phone and the unmanned vehicle (Step 320).

The method also includes, receiving information that corresponds to an operators' manipulation of vehicle controls disposed on a touch-sensitive display screen within the smart phone, to direct the unmanned vehicle (Step 330).

The method also includes, processing the information to reduce operator error within the information, by the smart phone (Step 340). For example, turning to FIG. 1, the control 105*a* can be manipulated by an operator placing her finger on the center of the control 105*a* and then sliding her finger in the direction. Upon the operator sliding her finger in a direction, the unmanned vehicle is directed, by the smart phone, to move in the direction. The further the operator slides her finger from the position where her finger first contacted the touch-screen display, the faster the unmanned vehicle moves in the direction. It is unlikely that the operator can slide her finger in a linear fashion, such that the operator's command can direct the unmanned vehicle's movement to be smooth. Thus, the smart phone compensates for non-linear manipulations made by the operator, such that the unmanned vehicle is directed in a smooth manner.

In some embodiments, the operator's directed acceleration and deceleration is non-linear. In these embodiments, a control (e.g., control 105*a* as described above) is manipulated by an operator to turn (e.g., rotate) the unmanned vehicle. For example, when the control is in a neutral position, the unmanned vehicle does not turn. When the control is manipulated to its right most position (or left most position), the robot turns right (or left) at a maximum rotation speed. When the control is between the neutral position and the right most position (or left most position), the unmanned vehicle rotates at as follows:

$$T=x*x*A \qquad \text{EQN. 1}$$

where T is the turning rate, x is a displacement of the control from the neutral position, and A is the maximum rotation speed. In some embodiments, the operator's directed acceleration and deceleration is linear. In these embodiments, when the control is between the neutral position and the right most position (or left most position), the unmanned vehicle rotates as follows:

$$T=x*A \qquad \text{EQN. 2}$$

where T is the turning rate, x is a displacement of the control from the neutral position, and A is the maximum rotation speed.

In some embodiments, a ramp up function is used when the operator directs the unmanned vehicle to turn. In some embodiments, the smart phone transmits a direction to the unmanned vehicle when the user manipulates a drive control (e.g., control 105*a*) a distance away from a center location. For example, turning to FIG. 1, if the operator slides control 105*a* more than 3 pixels from the point where the operator initially touched the touch-screen display, the smart phone transmits a command to the unmanned vehicle. If the operator slides control 105*a* less than or equal to 3 pixels from the point where the operator initially touched the touch-screen display, the smart phone doe not transmit the command to the unmanned vehicle.

The method also includes, transmitting the processed information to the unmanned vehicle (Step 350).

Figure 4A:
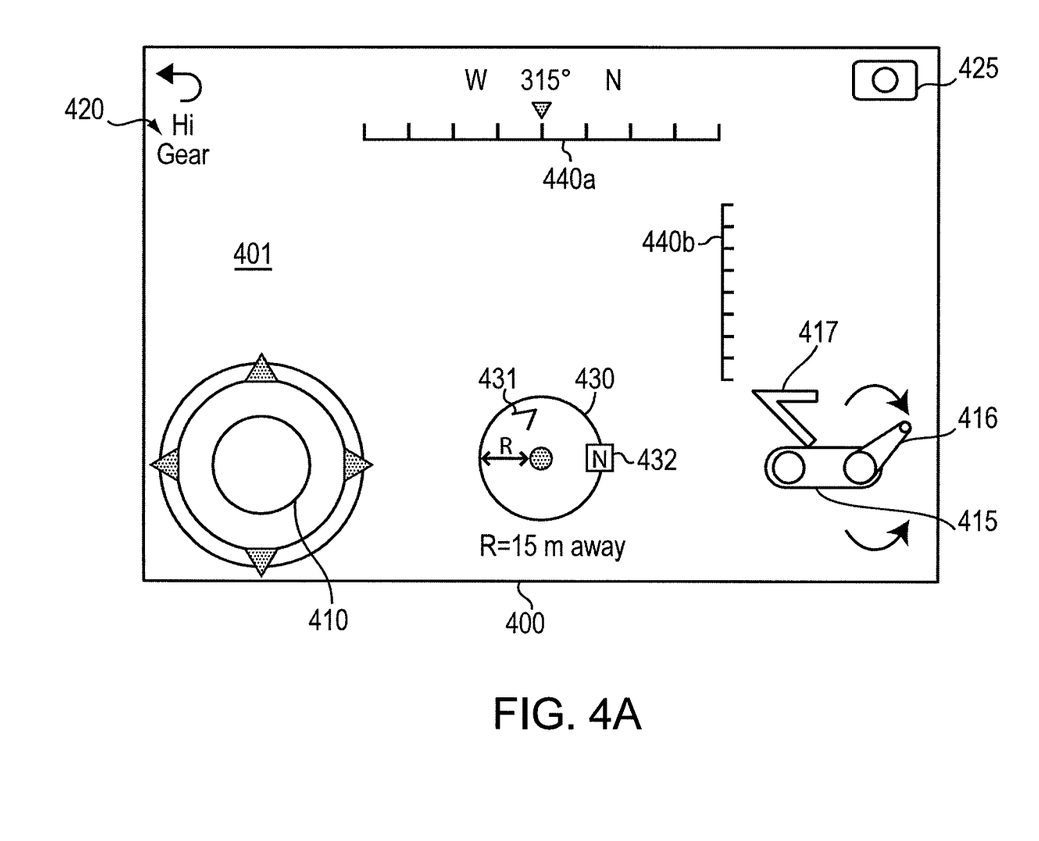
FIGS. 4A-4L are snap shots of an unmanned vehicle controller, according to various embodiments of the present invention.

FIG. 4A illustrates an exemplary touch-screen display controller 400 that controls an unmanned vehicle (e.g., Pack-Bot®) during start up. The touch-screen display controller 400 includes a touch-screen 401, controls and indicators. Controls include a drive control 410, a unmanned vehicle profile control 415, flipper control 416, robotic arm control 417, gear control 420, and a camera control 425. Indicators include a radar view indicator 430 and direction indicators 440*a* and 440*b*.

Drive control 410 is used to direct the unmanned vehicle to move. The drive control 410 allows an operator to direct the unmanned vehicle to move forward, reverse, right and left. The operator places her finger on the drive control 410 and slides her finger in a direction to direct the unmanned vehicle to move in the direction. In some embodiments, when the operator places her finger on the touch screen 401 near drive control 410, a central position of the drive control 410 is set to the location the operator touched on the touch screen 401.

Figure 4B:
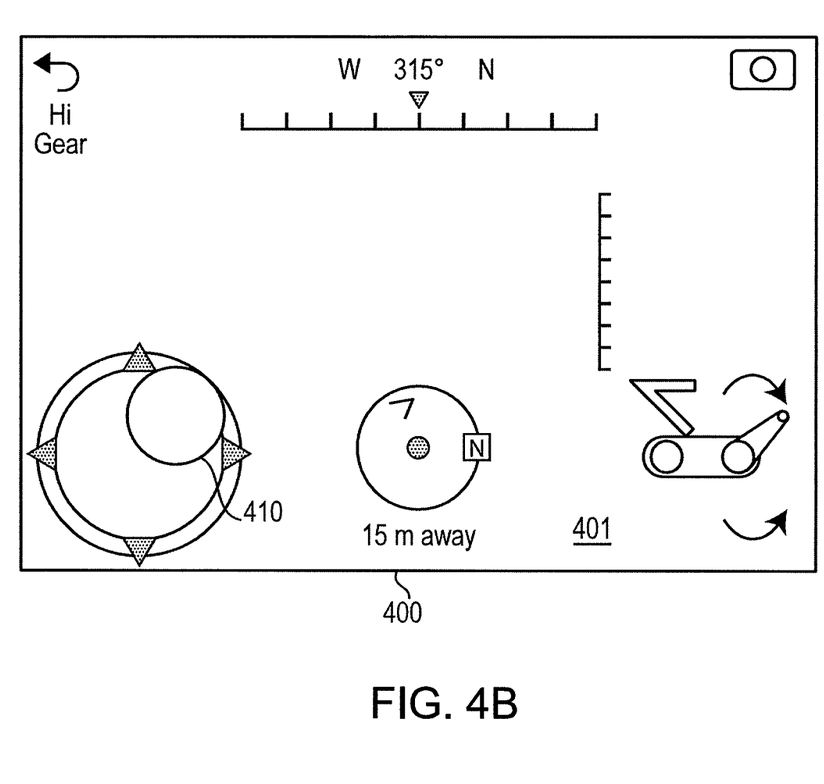

The drive controller 410 can be a variable speed joystick. As the drive controller 410 slides away from its center position, speed and turn rate can increase. The further away from the drive controller's center position the operator slides her finger, the faster the unmanned vehicle is directed to accelerate, up to the maximum acceleration and maximum speed of the unmanned vehicle. FIG. 4B illustrates the drive control 410 in a position to direct the unmanned vehicle to move.

Returning to FIG. 4A, unmanned vehicle profile control 415 can be used to direct flippers (e.g., flippers 112*a* and 122*b* as shown above in FIG. 1) and to direct a robotic arm (e.g., robotic arm 124 as shown above in FIG. 1) of the unmanned vehicle. The unmanned vehicle profile control 415 displays as a profile view of the unmanned vehicle.

Figure 4C:
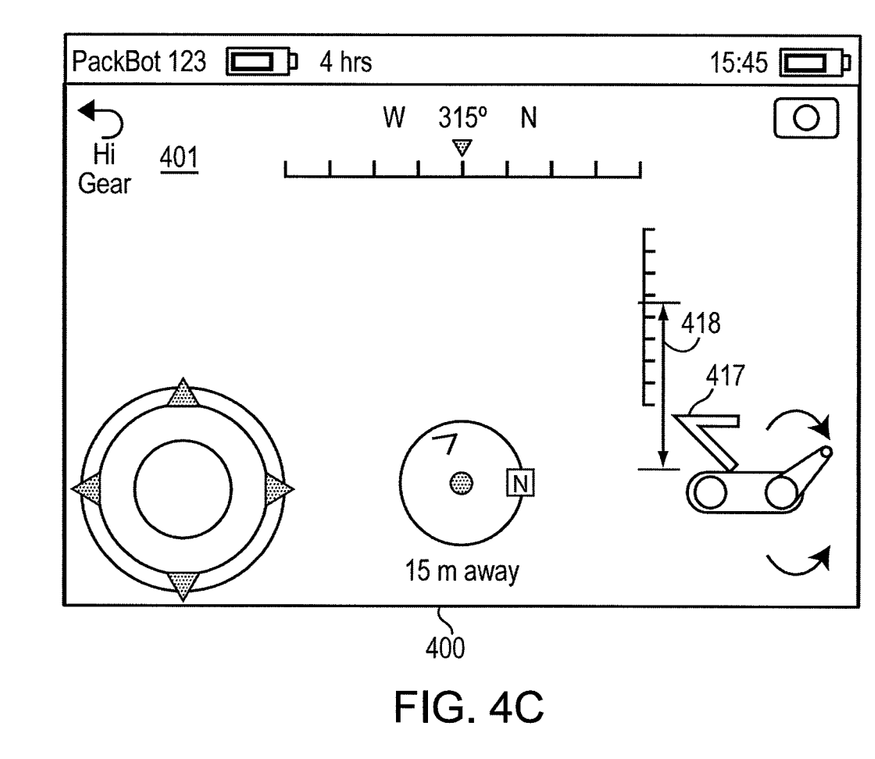

To direct the unmanned vehicle flippers to move, the operator places her finger on a flipper control 416 of the unmanned vehicle profile control 415 and slides her finger in the direction she wants to move the flippers. In some embodiments, the operator can direct the flippers to a position faster than the flippers can move. In these embodiments, the display can show the actual position of the flippers and the desired position of the flippers. In some embodiments, the touch-screen display controller 400 dampens the operators' direction to move the flippers. In some embodiments, when the actual flipper position is greater than a threshold value away from the desired flipper position, the flipper is rotated at a maximum flipper rotation speed to the desired position. In some embodiments, when the actual flipper position is less than a threshold value away from the desired flipper position, the flipper is rotated linearly at a maximum flipper rotation speed multiplied by the angular separation between the actual and desired flipper positions and divided by 180° degrees. In some embodiments, the threshold value is 180° degrees. To direct the robotic arm of the unmanned vehicle to move, the operator taps her finger on the robotic arm control 417 of the unmanned vehicle profile control 415. A slide arrow 418 appears when the operator taps her finger on the robotic arm control 417. FIG. 4C illustrates the robotic arm control 417 and the slide arrow 418. The operator can slide her finger along slide arrow 418 to direct the robotic arm of the unmanned vehicle to move up or down.

In some embodiments, the operator can store poses for the unmanned vehicle. To create stored poses, the operator specifies a position for the flippers and the robotic arm. When the operator directs the unmanned vehicle to move into a stored pose, the unmanned vehicle moves into the pose, without the operator having to manipulate the vehicle profile control 415.

Figure 4D:
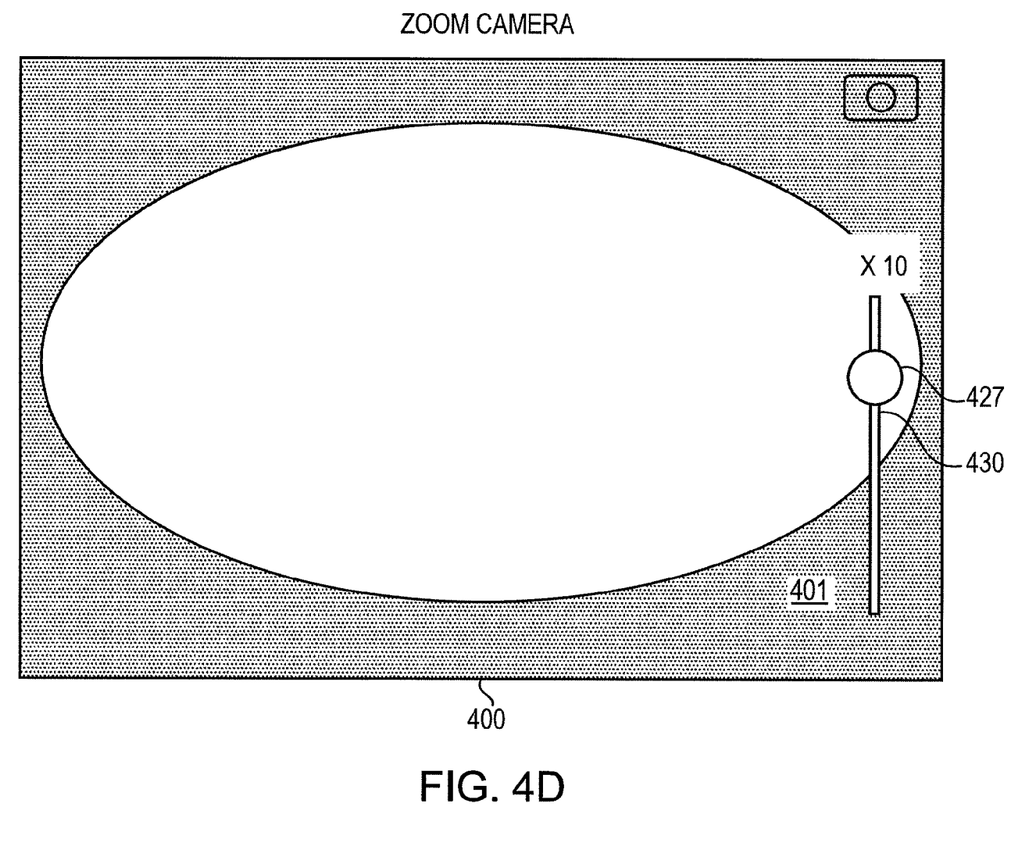

Camera control 425 can be used to direct a camera mounted on the unmanned vehicle. The operator can tap the camera control 425 with her finger to direct the camera to zoom. FIG. 4D illustrates an exemplary touch-screen display to control zoom of the camera. A button 427 of a slide bar 430 can be manipulated by the operator to zoom in and out. In some embodiments, when the operator slides the button 427 towards the camera control 425 the camera zooms in. In some embodiments, when the operator slides the button 427 towards the camera control 425 the camera zooms out. In some embodiments, when the operator slides the button 427 away from the camera control 425 the camera zooms in. In some embodiments, when the operator slides the button 427 away from the camera control 425 the camera zooms out. In some embodiments, the operator slides two fingers away from each other along the touch screen to direct the camera to zoom out. In some embodiments, the operator slides two fingers towards each other along the touch screen to direct the camera to zoom in.

Referring to FIG. 4A, the operator can swipe the camera control 425 once with her finger to direct the camera to pan. The operator can swipe the camera control 425 twice with her finger to direct the camera to move (e.g., tilt). For both pan and tilt, the operator can direct the speed of the pan and tilt in addition to the direction. In some embodiments, the operator slides one or more fingers to pan. In various embodiments, the pan moves in the same the direction that the operator slides the one or more fingers. In various embodiments, the pan moves in the opposite the direction that the operator slides the one or more fingers.

The operator can tap the camera control 425 to exit the camera zoom screen. In some embodiments, the unmanned vehicle has any number of cameras. In these embodiments, pan, tilt, and zoom controls can be displayed for each of the cameras. In some embodiments, the operator can direct the camera to record video and/or to take snap shots.

Gear control 420 can be used to limit the maximum speed that the smart phone directs the unmanned vehicle to move. For example, the gear control 420 can be set to a high gear setting, whereby the maximum speed that the smart phone directs the unmanned vehicle is the maximum speed that the unmanned vehicle can move (e.g., 7 mph). The gear control 420 can be set to a low gear setting, whereby the maximum speed that the smart phone directs the unmanned vehicle is a fraction of the maximum speed that the smart phone can move (e.g., 3 mph). Speed limiting can be used in various situations, e.g., the unmanned vehicle traveling in a building.

Figure 4E:
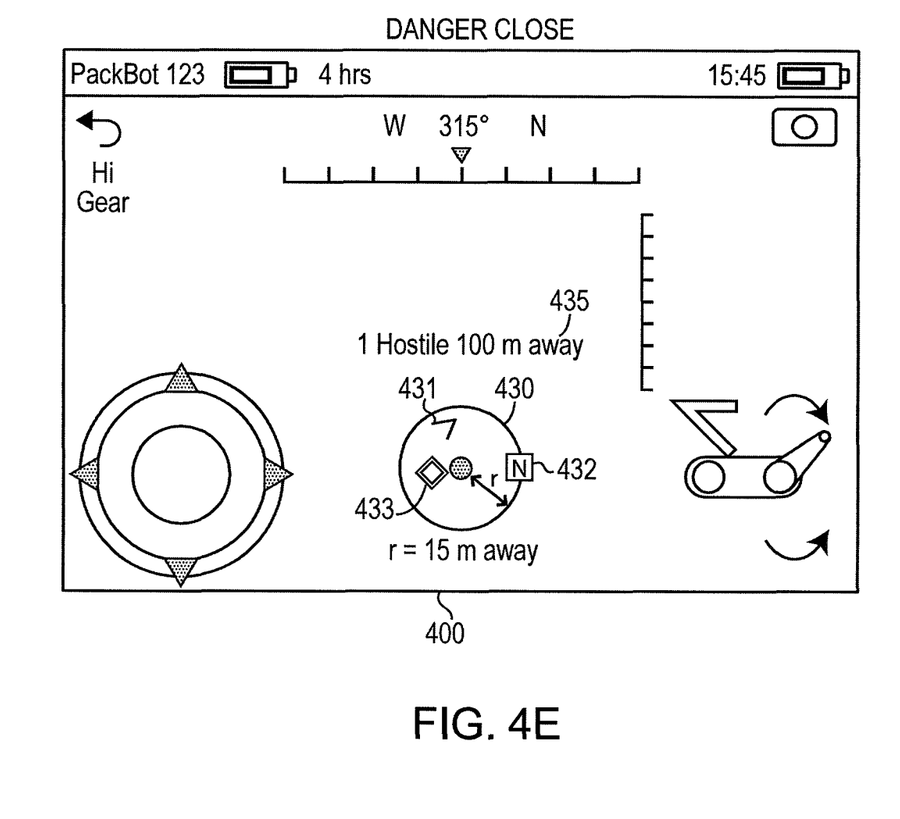

Radar view indicator 430 is a top down view showing an object's location 431 within a radius (r) of the unmanned vehicle. The radar view indicator 430 shows the direction of north 432 with respect to the position 432 of the unmanned vehicle. FIG. 4E illustrates a hostile object 433 as displayed within the radar view indicator 430. The text 435 informs the operator the distance (e.g., 100 m) from the unmanned vehicle to the hostile object 433. In some embodiments, the operator can tap on the radar view indicator 430 to view the objects within the radar view indicator 430 on a map.

Figure 4F:
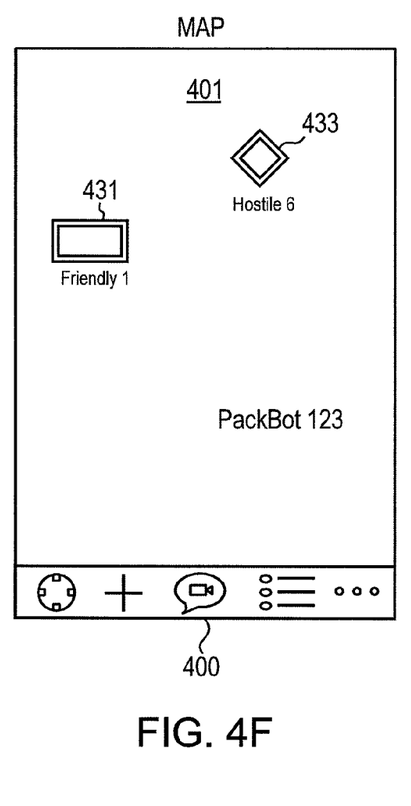

FIG. 4F illustrates the objects within the radar view indicator 430 on a map. In various embodiments, the map can be a terrain map, a street map, topographic map, or any other type of map. In some embodiments, the operator can use GPS on the smart phone to navigate to selected objects. In some embodiments, the operator can tap the object's location 431 and an arrow appears on the screen. The arrow indicates the direction to direct the unmanned vehicle to move in to reach the object's location. As the operator directs the unmanned vehicle in the direction of the arrow, the arrow continually updates to compensate for the change in position of the unmanned vehicle.

Figure 4G:
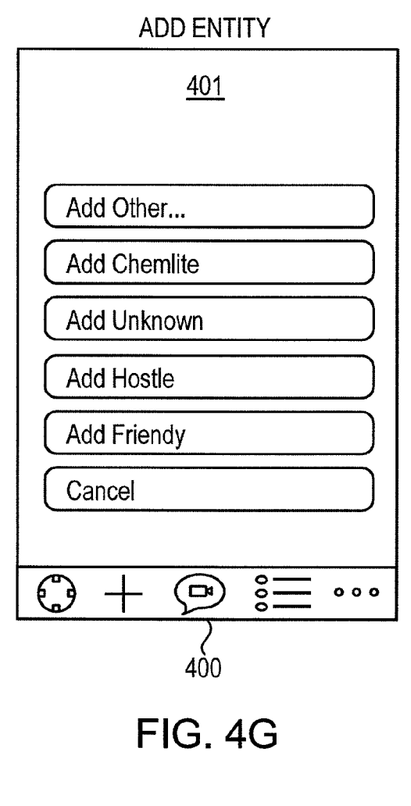
Figure 4H:
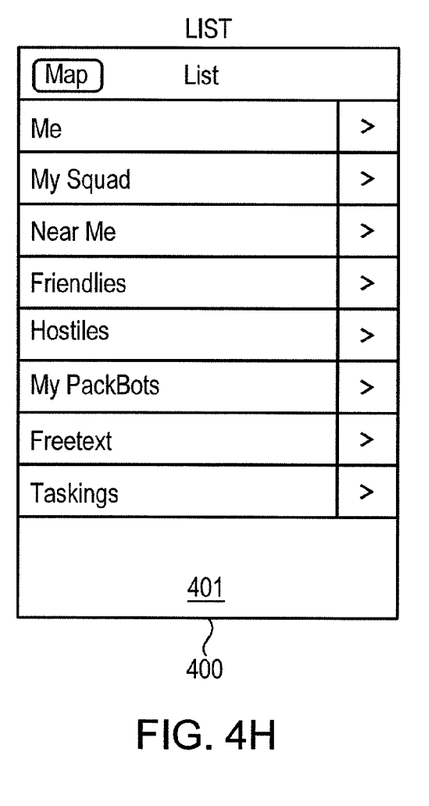

In various embodiments, the smart phone can receive object information from radars, command and control centers, text messages, phone messages, email, other unmanned vehicles, or operator input. The object information can include geolocation information, and/or a friendly or non-friendly indicator. FIG. 4G illustrates a menu that an operator can use to add an object to the radar view indicator 430. FIG. 4H illustrates a menu that an operator can use to obtain information related to each object within the radar view indicator 430.

Returning to FIG. 4A, direction indicators 440a and 440b display the pitch and roll of the unmanned vehicle.

Figure 4I:
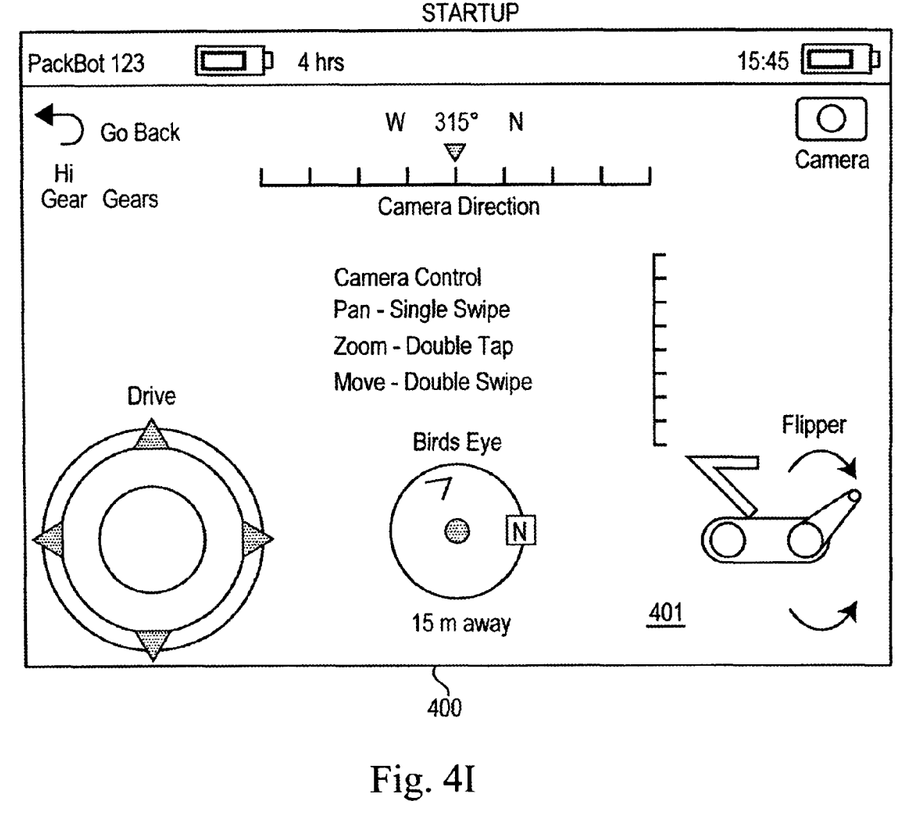

FIG. 4I illustrates an exemplary touch-screen display controller 400 during startup. During startup, text can be displayed on the touch-screen display to inform an operator of the function of each control.

Figure 4J:
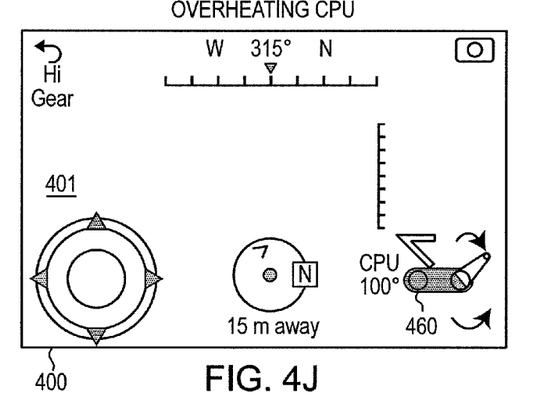
Figure 4K:
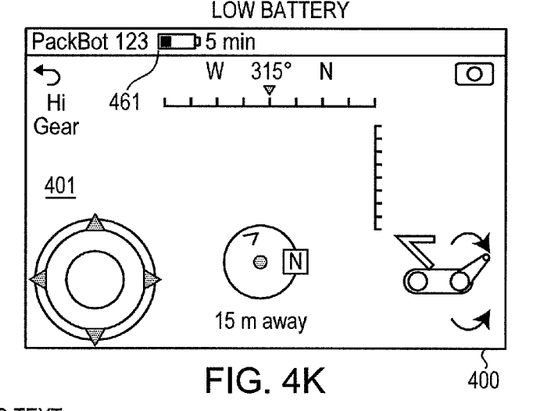
Figure 4L:
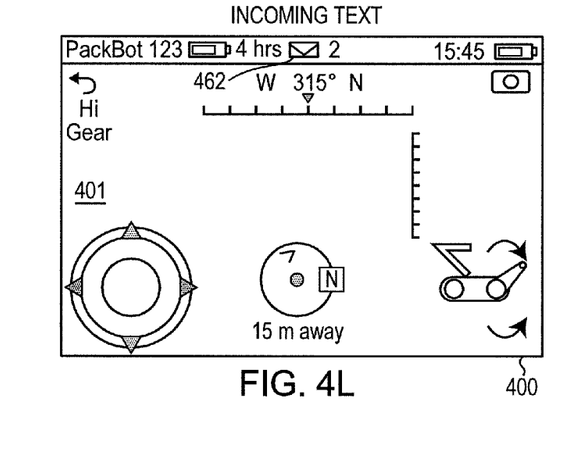

In various embodiments, the touch-screen display controller 400 can display information regarding various states of the unmanned vehicle. For example, the touch-screen display controller 400 can display battery life and/or heat conditions. FIG. 4I illustrates an overheating warning 460 that can be displayed on the touch-screen display controller 400. FIG. 4J illustrates a low batter warning 461 that can be displayed on the touch-screen display controller 400. FIG. 4K illustrates an incoming text message icon 462 to inform the operator that the smart phone has received a text message.

The smart phone can include a preprogrammed list of unmanned vehicles it can control. In these embodiments, the smart phone can transmit a request to establish communication to each of the unmanned vehicles and listen for a response. Upon receiving a response, the smart phone can provide a list of unmanned vehicle that have responded to the operator. The operator can select a specific unmanned vehicle to direct from the list of unmanned vehicles that have responded.

In some embodiments, the unmanned vehicle includes a laser range finder. In these embodiments, the touch-screen display controller can display a laser range finder button. The operator can tap the laser range finder button to obtain a report based on the unmanned vehicle's position and laser range finder information.

The above described techniques can be implemented by packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Transmitting devices can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art can appreciate the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computerized method for controlling an unmanned vehicle, comprising:
   receiving, by a smart phone, a request to control the unmanned vehicle;
   establishing, by the smart phone, wireless communication between the smart phone and the unmanned vehicle;
   receiving, by the smart phone, a video stream generated by the unmanned vehicle;
   displaying the video stream and vehicle controls on a touch-sensitive display screen within the smart phone;
   manipulating the vehicle controls to direct the unmanned vehicle;
   transmitting, by the smart phone, an initiation request via a cable to a rf transmitter;
   transmitting, by the rf transmitter, the initiation request to the unmanned vehicle;
   receiving, by the rf transmitter, a message from the unmanned vehicle; and
   transmitting, by the rf transmitter, the message from the unmanned vehicle to the smart phone via the cable to the smart phone.

2. The computerized method of claim 1, further comprising:
   receiving, by the smart phone, information to direct the unmanned vehicle;
   converting, by the smart phone, the information into a protocol recognizable by the unmanned vehicle; and
   transmitting, by the smart phone, the converted information to the unmanned vehicle.

3. The computerized method of claim 1, further comprising establishing communication with the unmanned vehicle via a wireless local area network.

4. The computerized method of claim 1, further comprising providing a joystick for governing the acceleration, deceleration, and direction of travel of the unmanned vehicle.

5. The computerized method of claim 4, further comprising providing a controller to govern movement of one or more robot arms of the unmanned ground vehicle.

6. The computerized method of claim 1, further comprising providing a control to set a maximum speed of the unmanned vehicle.

7. A computerized method for controlling an unmanned vehicle, comprising:
   receiving, by a smart phone, a request to control the unmanned vehicle;
   establishing, by the smart phone, wireless communication between the smart phone and the unmanned vehicle;
   receiving, by the smart phone, a video stream generated by the unmanned vehicle;
   displaying the video stream and vehicle controls on a touch-sensitive display screen within the smart phone;
   manipulating the vehicle controls to direct the unmanned vehicle; and
   providing a control to store a frame of the video stream as a picture on the smart phone.

8. A computerized method for controlling an unmanned vehicle, comprising:
   receiving, by a smart phone, a request to control the unmanned vehicle;
   establishing, by the smart phone, wireless communication between the smart phone and the unmanned vehicle;
   receiving, by the smart phone, a video stream generated by the unmanned vehicle;
   displaying the video stream and vehicle controls on a touch-sensitive display screen within the smart phone;
   manipulating the vehicle controls to direct the unmanned vehicle; and
   providing a control to command one or more cameras on the unmanned vehicle to zoom in or out.

9. A computerized method for controlling an unmanned vehicle, comprising:
   receiving, by a smart phone, a request to control the unmanned vehicle;
   establishing, by the smart phone, wireless communication between the smart phone and the unmanned vehicle;
   receiving, by the smart phone, a video stream generated by the unmanned vehicle;
   displaying the video stream and vehicle controls on a touch-sensitive display screen within the smart phone;
   manipulating the vehicle controls to direct the unmanned vehicle; and providing one or more controls to command the unmanned vehicle to one or more predetermined poses.

10. The computerized method of claim 9, further comprising displaying the controls and a geographic map on the display screen within the smart phone.

11. The computerized method of claim 9, further comprising displaying one or more arrows, the video stream, and the controls on the display within the smart phone, wherein the one or more arrows indicate a heading for the unmanned vehicle such that the unmanned vehicle can reach a specified location.

12. The computerized method of claim 9, further comprising receiving information to rotate the unmanned vehicle.

13. The computerized method of claim 9, further comprising receiving information to move a robotic arm on the vehicle.

14. A computerized method for controlling an unmanned vehicle, comprising:
  receiving, by a smart phone, a request to control the unmanned vehicle;
  establishing, by the smart phone, wireless communication between the smart phone and the unmanned vehicle;
  receiving, by the smart phone, a video stream generated by the unmanned vehicle;
  displaying the video stream and vehicle controls on a touch-sensitive display screen within the smart phone;
  manipulating the vehicle controls to direct the unmanned vehicle;
receiving, by the smart phone, information of objects within a distance of the unmanned vehicle; and
  displaying, on the smart phone, the unmanned vehicle with the objects positioned relative to the unmanned vehicle based the information.

15. A computerized method for controlling a plurality of unmanned vehicles, comprising:
  receiving, by a smart phone, a request to control the unmanned vehicles;
  establishing, by the smart phone, wireless communication between the smart phone and each of the unmanned vehicles;
  receiving, by the smart phone, a video stream from each of the unmanned vehicles;
  selecting, by the smart phone, one of the plurality of unmanned vehicles;
  displaying the video stream and vehicle controls of the selected vehicle on a display screen within the smart phone;
  manipulating the displayed vehicle controls to direct the selected unmanned vehicle; and
displaying controls that correspond to the particular unmanned vehicle from which the video stream is received.

16. The computerized method of claim 15, wherein establishing a wireless communication further comprises transmitting, by the smart phone, a signal to each of the plurality of unmanned vehicles, such that the signal changes to a protocol of the particular unmanned vehicle the signal is transmitting to.

17. A computerized method for controlling a plurality of unmanned vehicles, comprising:
  receiving, by a smart phone, a request to control the unmanned vehicles;
  establishing, by the smart phone, wireless communication between the smart phone and each of the unmanned vehicles;
  receiving, by the smart phone, a video stream from each of the unmanned vehicles;
  selecting, by the smart phone, one of the plurality of unmanned vehicles;
  displaying the video stream and vehicle controls of the selected vehicle on a display screen within the smart phone;
  manipulating the displayed vehicle controls to direct the selected unmanned vehicle; and
toggling between displaying the video stream and controls of each of the plurality of unmanned vehicles based on operator input.

18. A computerized method for controlling a plurality of unmanned vehicles, comprising:
  receiving, by a smart phone, a request to control the unmanned vehicles;
  establishing, by the smart phone, wireless communication between the smart phone and each of the unmanned vehicles;
  receiving, by the smart phone, a video stream from each of the unmanned vehicles;
  selecting, by the smart phone, one of the plurality of unmanned vehicles;
  displaying the video stream and vehicle controls of the selected vehicle on a display screen within the smart phone;
  manipulating the displayed vehicle controls to direct the selected unmanned vehicle; and
  selecting, by the smart phone, two of the plurality of the unmanned vehicles; and
  displaying the video stream and controls of the two selected vehicles on a display screen within the smart phone; and
  manipulating the displayed controls to direct the two selected unmanned vehicles.

* * * * *